United States Patent
Kim et al.

(10) Patent No.: US 7,123,830 B2
(45) Date of Patent: Oct. 17, 2006

(54) WDM SELF-HEALING OPTICAL RING NETWORK

(75) Inventors: Jong-Kwon Kim, Taejonkwangyok-shi (KR); Yun-Je Oh, Yongin-shi (KR); Ki-Cheol Lee, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 682 days.

(21) Appl. No.: 10/446,906

(22) Filed: May 28, 2003

(65) Prior Publication Data
US 2004/0151493 A1 Aug. 5, 2004

(30) Foreign Application Priority Data
Feb. 5, 2003 (KR) .................. 10-2003-0007222

(51) Int. Cl.
H04B 10/00 (2006.01)
H04B 10/08 (2006.01)
(52) U.S. Cl. .................. 398/3; 398/17; 398/19; 398/59; 398/83
(58) Field of Classification Search .......... 398/3, 398/17–19, 34, 45, 59, 83
See application file for complete search history.

(56) References Cited

U.S. PATENT DOCUMENTS

| | | | | |
|---|---|---|---|---|
| 6,134,036 A | * | 10/2000 | Andreozzi et al. | 398/1 |
| 6,198,721 B1 | * | 3/2001 | Mueller | 370/223 |
| 6,577,652 B1 | * | 6/2003 | Kamata | 370/535 |
| 6,853,811 B1 | * | 2/2005 | Wahler et al. | 398/7 |
| 6,907,201 B1 | * | 6/2005 | Frankel | 398/158 |

* cited by examiner

Primary Examiner—Dzung Tran
(74) Attorney, Agent, or Firm—Cha & Reiter, L.L.C.

(57) ABSTRACT

A WDM bidirectional self-healing optical ring network is provided in which an outer ring network and an inner ring network can both handle N optical signals. The network includes a node; an optical add/drop multiplexer having a 1×N demultiplexer and a 1×N multiplexer; a pair of optical switching devices each connected to an optical fiber link intervening between the optical add/drop multiplexer and another node on the both ends of the optical add/drop multiplexer; and, a pair of circulators each connected between the optical add/drop multiplexer and a particular optical switching device in the optical switching device pair, each circulator having three ports, two of the three ports being connected to a corresponding optical switching device and remaining one port being connected to the optical add/drop multiplexer.

6 Claims, 4 Drawing Sheets

WDM SELF-HEALING OPTICAL RING NETWORK

CLAIM OF PRIORITY

This application claims priority under 35 U.S.C. § 119 to an application entitled "WDM Self-healing Optical Ring Network", filed in the Korean Intellectual Property Office on Feb. 5, 2003 and assigned Serial No. 2003-7222, the contents of which are incorporated herein by reference.

BACKGROUND OF THE INVENTION

1. Field of the Invention

The present invention relates generally to an optical network, and in particular, to an optical network based on a wavelength division multiplexing (WDM) technology.

2. Description of the Related Art

As a WDM technology for transmitting a plurality of wavelengths through a single-strand optical fiber and its related fabrication techniques, including routing, switching, and adding/dropping of optical signals in a ring network, have dramatically improved, it is now possible to build an optical network, which provides a super high-speed transmission.

In general, a WDM optical network is divided into a mesh network consisting of optical cross connectors (OXCs) and a ring network consisting of optical add/drop multiplexers (OADMs). In the mesh network, as each network node is connected to a plurality of optical fibers, the switching mechanism used to address the link failure is complex and tend to degrade the recovery rate. However, in the ring network, as an optical add/drop multiplexer and a network node is connected to a 2-strand or 4-strand optical fiber, the switching mechanism is simple. Therefore, the ring network is more widely implemented.

A node provided in the WDM optical ring network can be comprised of optical add/drop multiplexers with an optical switching element for adding or dropping an optical signal, and switching devices for performing the protection-switching of the network. The ring network uses a 2-strand or 4-strand optical fiber corresponding to the number of input/output optical fibers. In addition, the ring network can be divided into a unidirectional transmission network and a bidirectional transmission network.

FIG. 1A illustrates a structure of a general WDM optical ring network, and FIG. 1B is a diagram illustrating the switching operation to address the link failure. In particular, FIGS. 1A and 1B illustrate the structure of a bidirectional optical ring network having a 4-strand optical fiber. The conventional WDM optical ring network comprised of a 4-strand optical fiber for transmitting an optical signal bidirectionally uses a link protection switching method based on a loop-back principle. As shown, a first outer ring network 4 of the optical ring network is used during a normal operation. If there is a link failure in the first outer ring network 4, a second outer ring network 3 of the optical ring network is used to perform the bypass of the optical signals based on the loop-back principle. In this regard, 2×2 optical switching devices 110a–180a are connected to the first outer ring network 4 and the second outer ring network 3 at both ends of the optical add/drop multiplexers 10a–40a. Similar to the configuration of the outer ring networks 3 and 4, the inner ring networks 1 and 2 1 also include a network 1 for a normal operation and a network 2 for recovery switching operation. Likewise, 2×2 optical switching devices 110b–180b are provided for the loop-back operation and also connected to the first inner ring network 1 and the second inner ring network 2 at both ends of optical add/drop multiplexers 10b–40b.

In the conventional optical ring network consisting of a 4-strand optical fiber, as the outer ring networks 3 and 4 and share no resource with the inner ring networks 1 and 2, it is possible to set the wavelengths used for transmission of an optical signal to the same value. That is, the outer ring transmits optical signals having wavelengths of λ1, λ2, λ3, ..., λN, and the inner ring also transmits optical signals having wavelengths of λ1, λ2, λ3, ..., λN. If a bidirectional transmission is provided, the outer ring transmits the optical signals clockwise, while the inner ring transmits the optical signals counterclockwise.

In the event of a link failure, a switching is performed by looping back the optical signal using the two 2×2 optical switching devices located on both sides of the failed link in the opposite direction. For example, as illustrated in FIG. 1B, if a failure occurs in an optical link of the network 4, which connects an optical add/drop multiplexer OADM1a (10a) to an optical add/drop multiplexer OADM2a (20a), optical signals of λ1, λ2, λ3, ..., λN, which were transmitted from the optical add/drop multiplexer OADM1a (10a) to the optical add/drop multiplexers OADM2a (20a), are looped back to the second outer protection switching ring network 3 through an optical switching device sw12 (120a), thus traveling in a counterclockwise direction through the second outer ring network 3. Ultimately, the optical signals of λ1, λ2, λ3, ..., λN transmitted through the second outer protection switching ring network 3 are delivered to the optical add/drop multiplexer OADM2a (20a) via an optical switching device sw21 (130a).

As illustrated by the optical switching device sw12 (120a) of FIG. 1A, when a optical transmission link normally operates, the 2×2 optical switching device is in a bar (parallel) state, so that a signal applied to an input#1 (i1) is delivered to an output#1 (o1), and a signal applied to an input#2 (i2) is delivered to an outpt#2 (o2). However, when a failure occurs in the optical link, the optical switching device is in a cross state, causing signal applied to an input#1 (i1) to be delivered to an output#2 (o2), and a signal applied to an input#2 (i2) is delivered to an output#1 (o1). At this time, an optical switching device which is not adjacent to the failed link, is still in a bar state.

As explained above, for a bidirectional self-healing optical ring network to work, a 4-strand optical fiber is necessary, thus complicating and increasing the cost of the network. Therefore, there is a need to provide an improved network that is simple and less expensive to implement.

SUMMARY OF THE INVENTION

The present invention is directed to a WDM bidirectional self-healing optical ring network, which consists of a plurality of optical add/drop multiplexers having circulators designed to reduce installation and maintenance cost of an optical fiber. The optical ring network according to the teachings of the present invention comprises a 2-strand optical fiber, instead of a 4-strand optical fiber as in the prior art.

In one embodiment, a WDM (Wavelength Division Multiplexing) bidirectional self-healing optical ring network is provided in which an outer ring network and an inner ring network can handle both N optical signals. The network includes a node; an optical add/drop multiplexer having a 1×N demultiplexer and a 1×N multiplexer; a pair of optical switching devices each connected to an optical fiber link intervening between the optical add/drop multiplexer and another node on both ends of the optical add/drop multiplexer, an optical fiber link for protection switching being connected between the optical switching devices; and, a pair of circulators each connected between the optical add/drop multiplexer and a particular optical switching device in the optical switching device pair, each circulator having three ports, two of the three ports connected to a corresponding optical switching device and the remaining one port connected to the optical add/drop multiplexer. The optical switching device pair independently switches an input optical signal for a case where an optical fiber link for the two output terminals connected to the two ports of a particular circulator in the circulator pair is in a normal state and another case where the optical fiber link is failed.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE PREFERRED EMBODIMENT

The present invention provides a WDM bidirectional self-healing optical ring network with a 2-strand optical fiber, instead of the conventional 4-strand optical fiber, thereby contributing to a reduction in the installation and maintenance cost of the optical fiber and securing an efficient operation.

Figure 1:
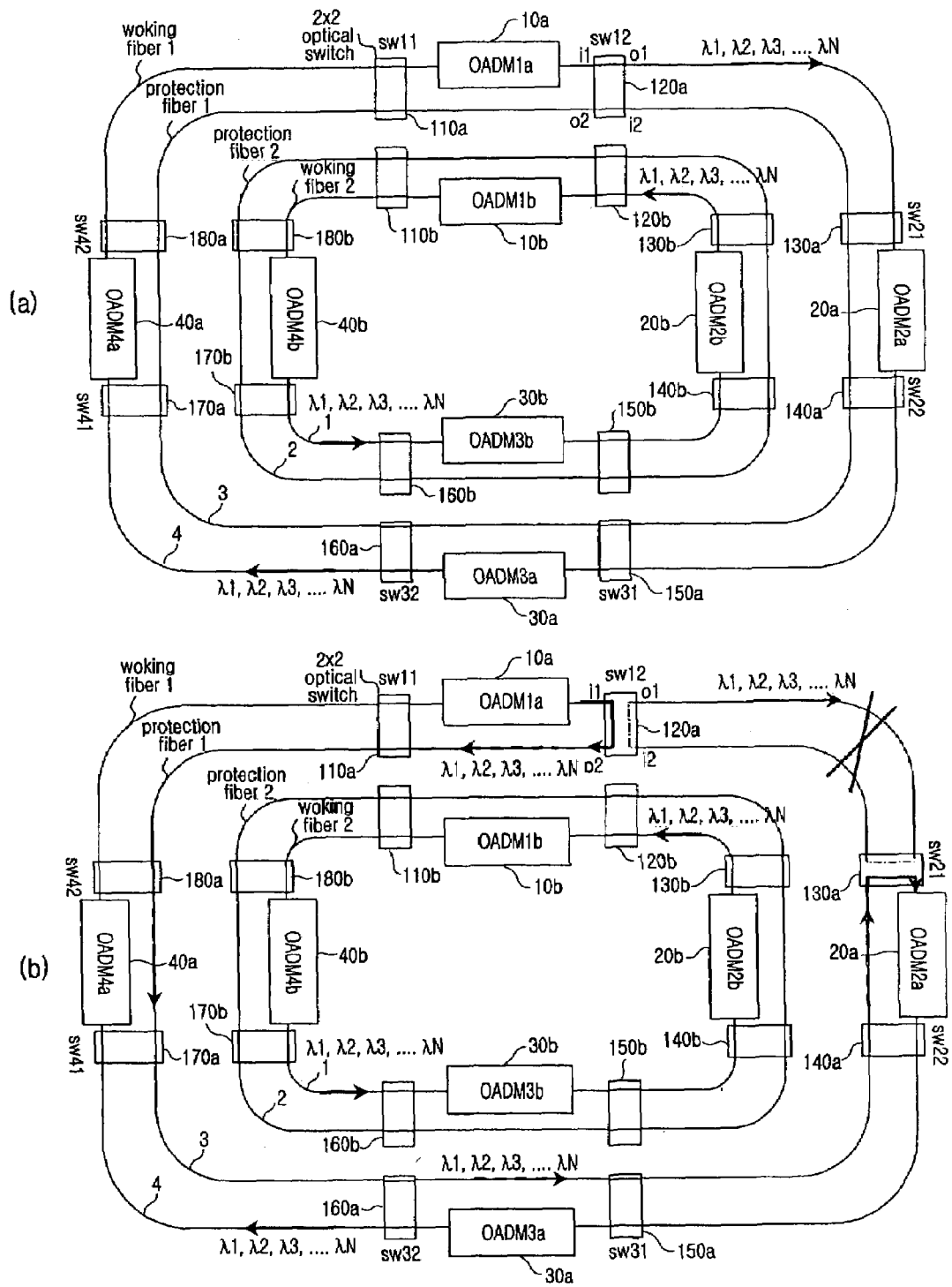
FIGS. 1A and 1B illustrate the structure of a general WDM optical ring network.
Figure 2:
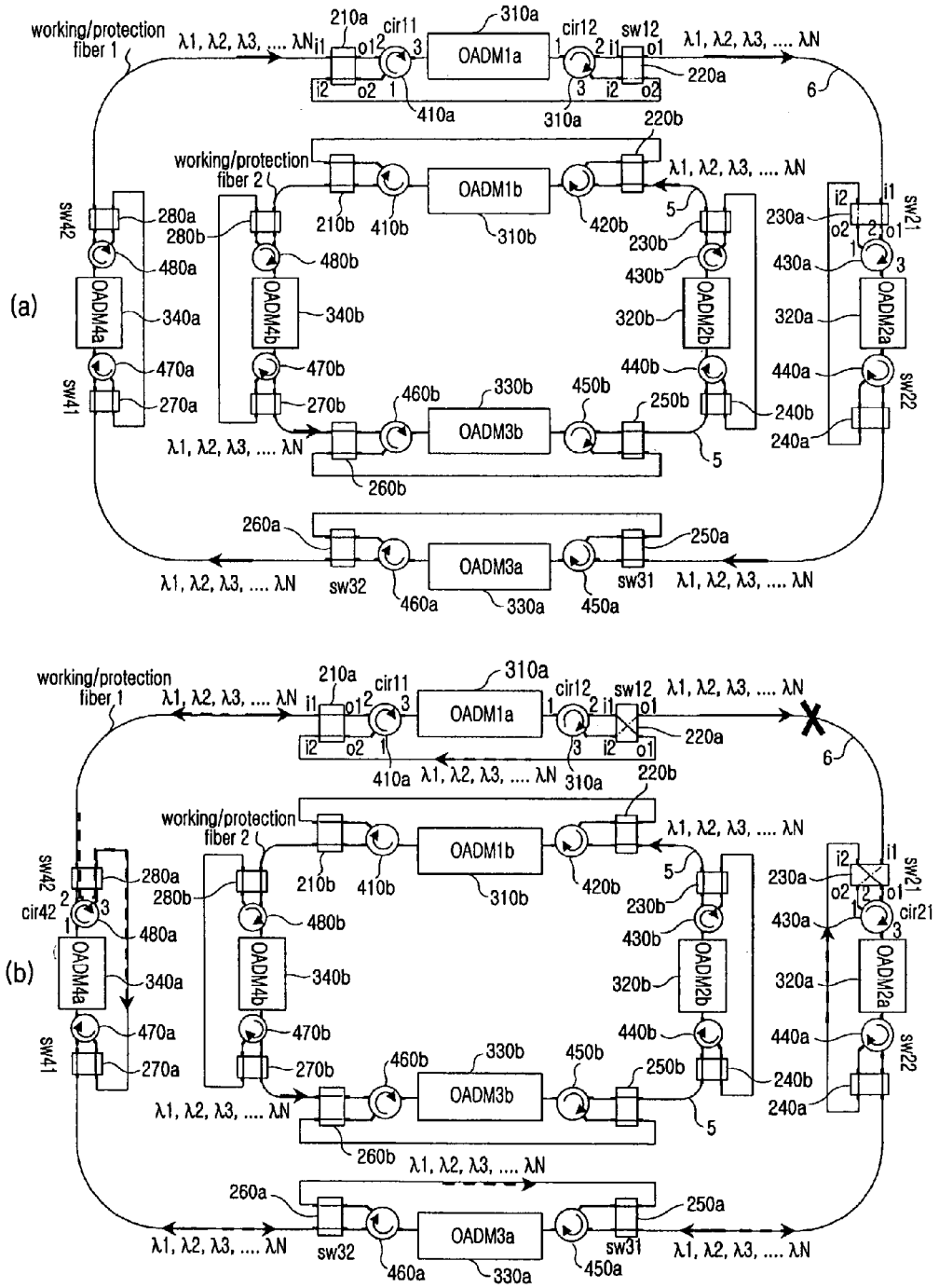
FIGS. 2A and 2B illustrate the structure of a WDM self-healing optical ring network, which includes optical add/drop multiplexers with circulators and 2×2 optical switching devices according to an embodiment of the present invention.

FIGS. 2A and 2B illustrate the structure of a WDM self-healing optical ring network having optical add/drop multiplexers (OADMs) with circulators and 2×2 optical switching devices according to the embodiment of the present invention. More specifically, FIG. 2A illustrates a case where the network normally operates without a link failure, and FIG. 2B illustrates a case where a failure occurs in an optical transmission link, which connects an optical add/drop multiplexer OADM1*a* to an optical add/drop multiplexer OADM2*a*.

In an optical ring network comprising a 2-strand optical fiber for bidirectional transmission as shown in FIGS. 2A and 2B, the outer ring network 6 transmits an optical signal clockwise, while the inner ring network 5 transmits an optical signal counterclockwise. This type of network may contain one or more nodes for facilitating the transmission of optical signals. Herein, the present invention will be described with reference to the outer ring network 6 only, for avoid redundancy. However, it will be understood by those skilled in the art that the teachings of the present invention can be applied in the same way to the inner ring network 5.

Each node of the outer optical ring network 6 includes optical add/drop multiplexers 310*a*–340*a* each having a 1×N demultiplexer and a 1×N multiplexer, respectively. Both ends of the optical add/drop multiplexers 310*a*–340*a* are connected to their associated optical fiber links, which are connected between the corresponding optical add/drop multiplexer and other adjacent nodes. A pair of switching devices 210*a*–280*a* is connected between the corresponding optical add/drop multiplexer and the optical fiber links.

Each node of the outer optical ring network 6 further includes a pair of circulators 410*a*–480*a*, connected between the corresponding optical add/drop multiplexer and the optical switching device. Each of the circulators 410*a*–480*a* has three ports: two of the three ports are connected to the corresponding optical switching device, and the remaining one port is connected to the corresponding optical add/drop multiplexer. The 3-port circulators 410*a*–480*a* are formed such that a signal applied to a port#1 is outputted to a port#2 and a signal applied to the port#2 is outputted to a port#3.

Referring to FIG. 2B, in the case where a failure occurs in an optical fiber link, an optical signal is looped back using two 2×2 optical switching devices and 2 circulators located at the both ends of the failed link, thus enabling the optical signal to transmit in the opposite direction. Here, the transmission signal is looped back by changing a connection state of the 2×2 optical switching devices sw12 (220*a*) and sw21 (230*a*) to a cross state. More specifically, in the ring network 6, when optical signals λ1, λ2, λ3, . . . , λN propagating from the 2×2 optical switching device sw12 (220*a*) to the optical switching device sw21 (230*a*) are looped back, the optical signals are delivered to an output#2 o2 of the optical switching device sw12 (220*a*), and then applied to an input#2 i2 of the optical switching device sw11 (210*a*). That is, an optical signal applied to an input#1 i1 of the optical switching device sw12 (220*a*) is outputted to the output#2 o2, as the optical switching device sw12 (220*a*) switches its input#1 i1 from an output#1 o1 to the output#2 o2 according to a switch control signal (not shown).

An optical signal outputted from the output#2 o2 of the optical switching device sw12 (220*a*) is applied to the input#2 i2 of the optical switching device sw11 (210*a*) through an optical fiber line 7 for the purpose of protection/recovery switching. The signal applied to the input#2 i2 of the optical switching device sw11 (210*a*) is delivered to a port#1 of a circulator cir11 (410*a*). The optical signal is delivered from the port#1 to a port#2 of the circulator cir11 (410*a*), then outputted to an output#1 o1 of the optical switching device sw11 (210*a*). That is, an optical signal outputted to the port#2 of the circulator cir11 (410*a*) progresses from the output#1 o1 to an input#1 i1 of the optical switching device sw11 (210*a*) in the opposite direction. The optical switching device is connected to change directionality of input and output signals, so that a signal transmitted in a reverse direction is not affected by the optical switching device. Therefore, as illustrated in FIG. 2B, to the input#1 i1 of the optical switching device sw11 (210*a*) is configured so that a signal can be transmitted clockwise and also outputs a signal to be looped back counterclockwise.

Meanwhile, an optical switching device in a node that is not adjacent to the failed optical fiber link maintains a bar state. In this state, the optical signal looped back counterclockwise from the optical add/drop multiplexer OADM1*a* (310*a*) is applied to a port#2 of a circulator cir42 (480*a*) via an optical switching device sw42 (280*a*). The optical signal applied to the port#2 of the circulator cir42 (480*a*) is outputted to a port#3 of the circulator cir42 (480*a*), and delivered to an optical switching device sw41 (270a) via the optical switching device sw42 (280a). In the same way, the looped-back signal is eventually transmitted to an input#2 i2 of the optical switching device sw21 (230a). Since the optical switching device sw21 (230a) is in a cross state, the optical signal applied to the input#2 i2 of the optical switching device sw21 (230a) is delivered to an output#1 o1, and then delivered to a port#2 of the circulator cir21 (430a). The optical signal applied to the port#2 of the circulator cir21 (430a) is outputted to a port#3, thus accomplishing the recovery switching in response to the link failure.

Figure 3:
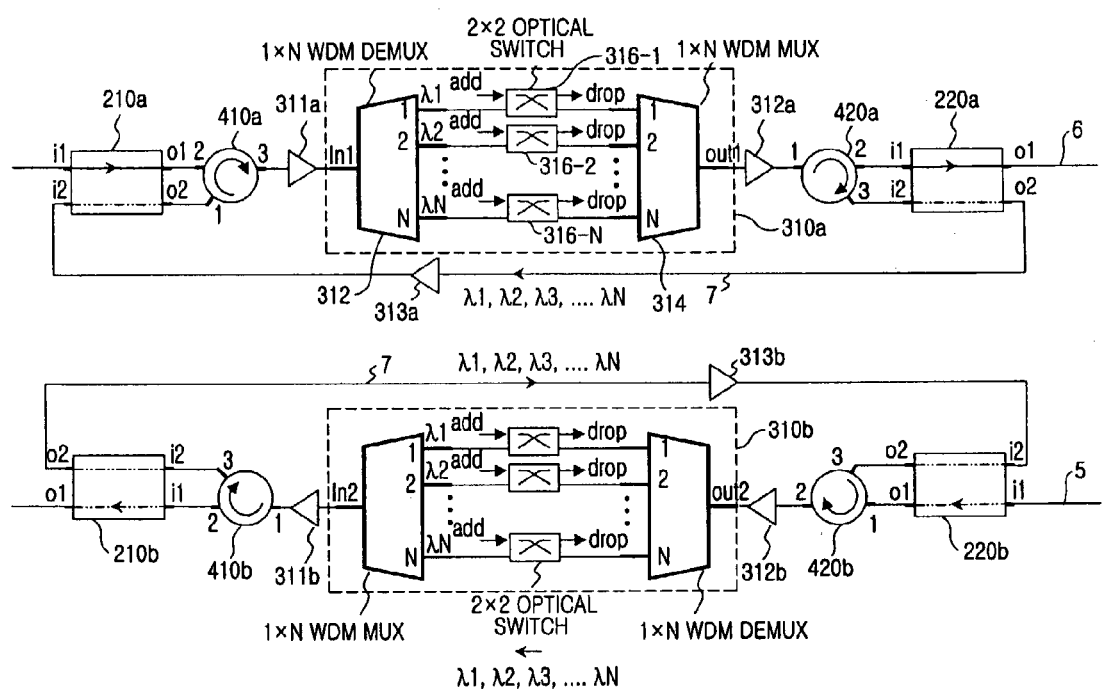
FIG. 3 illustrates the structure of optical add/drop multiplexers and 2×2 optical switching devices according to a preferred embodiment of the present invention.

FIG. 3 illustrates the structure of optical add/drop multiplexers and 2×2 optical switching devices according to the preferred embodiment of the present invention.

Referring back to FIGS. 2A and 2B and in conjunction with FIG. 3, an optical add/drop multiplexer OADMa (310a) has a function of adding/dropping optical signals having wavelengths of λ1, λ2, λ3, . . . , λN clockwise. In contrast, an optical add/drop multiplexer OADMb (310b) has a function of adding/dropping optical signals having wavelengths of λ1, λ2, λ3, . . . , λN counterclockwise.

As shown, the optical add/drop multiplexers 310a and 310b each includes a 1×N WDM demultiplexer (DEMUX) 312, a 1×N WDM multiplexer (MUX) 314, and N 2×2 optical switches 316-1, 316-2, . . . , 316-N. Optical amplifiers 311a and 312a are connected to an input port of the demultiplexer 312 and an output port of the multiplexer 314, respectively. The optical amplifier 311a is operative to compensate a transmission link loss, and the optical amplifier 312a is operative to compensate an insertion loss of the corresponding optical add/drop multiplexer.

The circulators 410a, 410b, 420a and 420b each have 3 ports and constructed so that a signal applied to a port#1 is outputted to a port#2 and a signal applied to the port#2 is outputted to a port#3. A port#3 of the circulator cir11 (410a) is connected to an input of the optical amplifier 311a, and a port#1 of the circulator cir12 (420a) is connected to an output of the optical amplifier 312b. A port#1 of the circulator cir11 (410a) is connected to an output#2 o2 of the 2×2 optical switching device sw11 (210a), and a port#2 of the circulator cir11 (410a) is connected to an output#1 o1 of the 2×2 optical switching device sell (210a). An input#1 i1 of the 2×2 optical switching device sw11 (210a) receives multiplexed optical signals of λ1, λ2, λ3, . . . , λN that are transmitted clockwise, and an input#2 i2 of the 2×2 optical switching device sw11 (210a) is connected to an output#2 o2 of the 2×2 optical switching device sw12 (220a) so that the input#2 i2 of the 2×2 optical switching device sw11 (210a) receives an optical signal looped back from the optical switching device sw12 (220a). An optical fiber 7 for connecting the 2×2 optical switching device sw11 (210a) to the 2×2 optical switching device sw12 (220a) includes an optical amplifier 313a in order to compensate for a loss in the looped-back signal.

As illustrated in FIG. 3, as to the connection between the circulator cir12 (420a) and the optical switching device sw12 (220a), the port#1 of the circulator cir12 (420a) is connected to an output of the optical amplifier 312a. A port#1 of a circulator cir22 (420b) is connected to an output of an optical amplifier 312b. A port#2 of the circulator cir12 (420a) is connected to an input#1 i1 of the 2×2 optical switching device sw12 (220a), and a port#3 of the circulator cir12 (420a) is connected to an input#2 i2 of the 2×2 optical switching device sw12 (220a).

As described above, the 2×2 optical switching devices 210a, 210b, 220a and 220bare in a bar state in the case where the ring network operates normally, so that a signal applied to an input#1 i1 is delivered to an output#1 o1 and a signal applied to an input#2 i2 is delivered to an output#2 o2. That is, in a bar state, a signal delivered to the output#1 o1 of the optical switching device sw11 (210a) is applied to the port#2 of the circulator cir11 (410a), and then outputted to the port#3 of the circulator cir11 (410a). However, when a failure occurs, optical switching devices situated on both ends of the failed link becomes a cross state. In the cross state, a signal applied to an input#1 is delivered to an output#2 and a signal applied to an input#2 is delivered to an output#1. For example, a transmission signal outputted to the output#1 o1 of the optical switching device sw12 (220a) is looped back to the input#2 i2 of the optical switching device sw11 (210a) via an optical amplifier 313a, by setting a switching state of the optical switching device sw12 (220a) to a cross state according to a prescribed control signal (not shown).

Figure 4A:
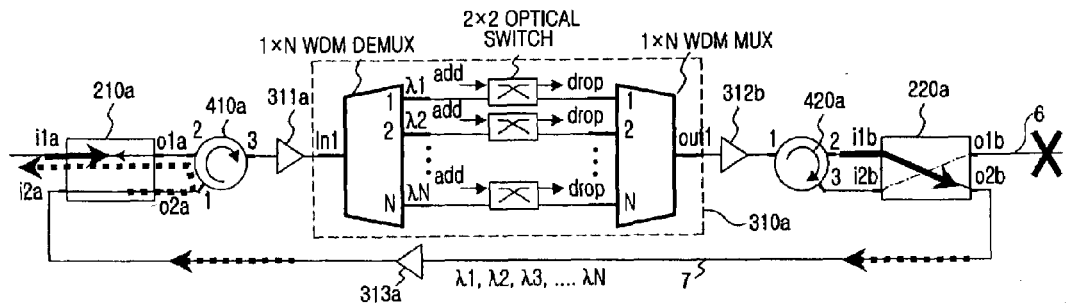
FIGS. 4A to 4C illustrate a detailed state of the nodes of bidirectional optical ring networks configured to perform the recovery switching process according to an embodiment of the present invention.
Figure 4B:
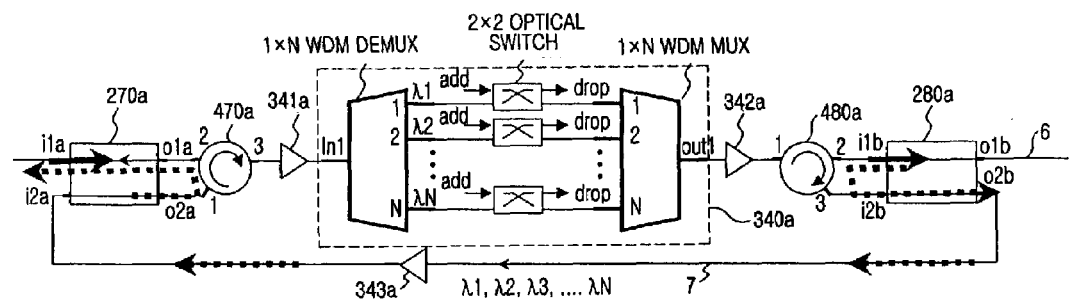
Figure 4C:
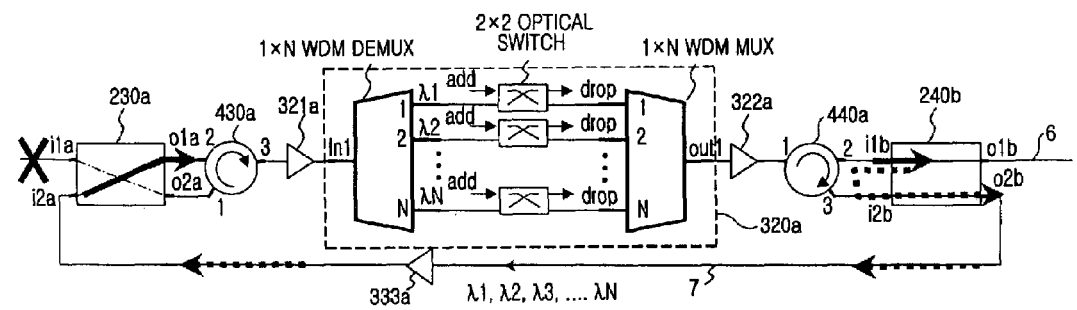

FIGS. 4A to 4C illustrate detailed states of nodes of the bidirectional optical ring networks according to the embodiment of the present invention. Herein, an optical add/drop multiplexer and its associated 2×2 optical switching devices will be described on the assumption that a failure has occurred in an optical fiber link between the optical add/drop multiplexer 310a and the optical add/drop multiplexer 320a of FIGS. 2A and 2B. Note that for achieving a recovery switching process of a bidirectional optical ring network, an optical switching device for a particular node becomes one of (1) an optical switching device for a node adjacent to the left side (counterclockwise) of a failed link, (2) an optical switching device for a node which is not adjacent to the failed link, and (3) an optical switching device for a node adjacent to the right side (clockwise) of the failed link.

FIG. 4A illustrates a node located on the left side (counterclockwise) of a failed link. Referring back to FIGS. 2A, 2B, as optical signals of λ1, λ2, λ3, . . . , λN propagating clockwise direction cannot transmit due to the failure of the optical fiber link, the optical switching device 220a is switched to loop back the optical signal propagating clockwise over the optical transmission link 6 in a reverse direction in response to a switch control signal (not shown). That is, the optical switching device 220a loops back an optical signal received at an input#1b i1b to an output#2b o2b (see a bold line). The looped-back signal (see a bold dotted line) is delivered to an input#2a i2a of the optical switching device 210a counterclockwise via an optical amplifier 313a. The signal delivered from the input#2a i2a to an output#2a o2a of the optical switching device 210a is outputted to a port#2 via a port#1 of the circulator cir11 (410a), and then transmitted counterclockwise via an output#1a o1a and an input#1a i1a of the optical switching device 210a. In FIG. 4A, a thin dotted line in the optical switching device 220a represents that no signal is delivered.

FIG. 4B illustrates a node that is not adjacent to a failed link, wherein a looped-back signal, including the normal signal propagating in a clockwise direction, propagate in the opposite directions using a circulator and a switching device. Referring back to FIGS. 2A, 2B, if an optical fiber link failure occurs, then optical signals of λ1, λ2, λ3, . . . , λN that must be transmitted clockwise, i.e., transmitted from the optical switching device 270a to the optical switching device 280a, are transmitted counterclockwise, i.e., transmitted from the optical switching device 280a to the optical switching device 270a.

The optical switching device 280a outputs an optical signal to be delivered to the output#1b o1b, to its input#b i1b. As described earlier, the optical switching device changes its directionality of input and output signals, so that a signal transmitted in a reverse direction is not affected by the optical switching device.

The optical signal outputted to an input#1b i1b of the optical switching device 280a is delivered to a port#2 of the circulator 480a, and then outputted to a port#3 of the circulator 480a. The optical signal outputted to the port#3 of the circulator 480a is delivered counterclockwise to an input#2a i2a of the optical switching device 270a via an optical amplifier 343a. The optical signal delivered to the input#2a i2a of the optical switching device 270a is provided from the output#2a o2a of the optical switching device 280a, and then applied to a port#1 of the circulator 470a. The optical signal is outputted to a port#2 via the port#1 of the circulator 470a, and then applied to an output#a o1a of the optical switching device 270a. The optical signal delivered to the output#1a o1a of the optical switching device 270a is transmitted counterclockwise (see bold dotted line) via an output#1a o1a of the optical switching device 270a. In FIG. 4B, a thin solid line represents that no signal is transmitted.

FIG. 4C illustrates a node located on the right side (clockwise) of a failed link. Since the optical signals of λ1, λ2, λ3, . . . , λN, which were looped back counterclockwise, are signals that must be the intended signals prior to the link failure, these signals must be restored to their original direction using optical switching devices and circulators.

Referring back to FIGS. 2A, 2B, the counterclockwise looped-back optical signals of λ1, λ2, λ3, . . . , λN are applied to a port#2 of the circulator 440a via the optical switching device 240a. The optical signal (see a bold dotted line) outputted to a port#3 of the circulator 440a via the port#2 of the circulator 440a is delivered counterclockwise to an input#2a i2a of the optical switching device 230a via an optical amplifier 333a. The optical switching device 230a is switched to loop back the optical signal delivered to the input#2a i2a clockwise according to a switch control signal (not shown). That is, the optical switching device 230a loops back the optical signal delivered to the input#2a i2a to an output#1a o1a (see a bold line). The looped-back signal (see a bold dotted line) is transmitted clockwise via the optical switching device 240a.

Having thus described a preferred embodiment of a bidirectional self-healing optical ring network for recovery switching in an optical network, it should be apparent to those skilled in the art that certain advantages of the system have been achieved. For example, the present invention can reduce the number of required optical fiber links about half using circulators and without adding additional optical fiber links for the recovery switching, by providing a bidirectional self-healing optical ring network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. In a WDM (Wavelength Division Multiplexing) bidirectional self-healing optical ring network having an outer ring and an inner ring for transmission of an optical signal, a node comprising:

at least one optical add/drop multiplexer having a 1×N demultiplexer and a 1×N multiplexer;

a pair of optical switching devices disposed at both ends of the optical add/drop multiplexer, each connected to an optical fiber link connected to the optical add/drop multiplexer; and a pair of circulators each connected between the optical add/drop multiplexer and the respective optical switching devices, each circulator having three ports, two of the three ports coupled to a corresponding optical switching device and remaining one port coupled to the optical add/drop multiplexer;

wherein the optical switching device selectively switches between a bar state and a cross state depending on whether there is an optical link failure in adjacent node.

2. The node of claim 1, wherein, upon the detection of an optical link failure, the optical switching device is operative to change the direction of the optical signal by looping back an optical signal in an opposite direction.

3. The node of claim 1, further comprising an optical amplifier for compensating for an optical signal in the looped back optical signal.

4. The node of claim 1, further comprising an optical amplifier interposed between one port of a particular circulator in the circulator pair and the optical add/drop multiplexer for compensating for a transmission loss of an optical fiber link and an insertion loss caused by the optical switching device and the circulator.

5. The node of claim 1, wherein the optical switch device is a 2×2 optical switch.

6. The node of claim 1, wherein the outer ring network transmits an optical signal in a clockwise direction and the inner ring network transmits an optical signal in a counterclockwise direction.

* * * * *